(12) United States Patent
Brunone (10) Patent No.: US 7,726,468 B2
(45) Date of Patent: Jun. 1, 2010

(54) CONVEYOR BELT AND CONVEYOR COMPRISING SAID BELT

(76) Inventor: Rene Brunone, 46, Rue du General Leclerc, Saint-Marcel (FR) F-27950

( * ) Notice: Subject to any disclaimer, the term of this patent is extended or adjusted under 35 U.S.C. 154(b) by 13 days.

(21) Appl. No.: 11/628,846

(22) PCT Filed: Jun. 9, 2005

(86) PCT No.: PCT/FR2005/001434

§ 371 (c)(1),
(2), (4) Date: Feb. 8, 2007

(87) PCT Pub. No.: WO2005/123552

PCT Pub. Date: Dec. 29, 2005

(65) Prior Publication Data

US 2007/0235289 A1    Oct. 11, 2007

(30) Foreign Application Priority Data

Jun. 9, 2004    (FR)    ................... 04 06249

(51) Int. Cl.
*B65G 15/08* (2006.01)
*B65G 15/40* (2006.01)
*B65G 15/60* (2006.01)
*B65G 39/10* (2006.01)

(52) U.S. Cl. .................. 198/819; 198/820; 198/821; 198/823; 198/824; 198/825

(58) Field of Classification Search ............... 198/819, 198/820, 821, 823, 824, 825
See application file for complete search history.

(56) References Cited

U.S. PATENT DOCUMENTS

| 3,089,581 | A | * | 5/1963 | Moar | 198/832 |
| 3,338,383 | A | * | 8/1967 | Hashimoto | 198/819 |
| 4,958,724 | A | * | 9/1990 | Hashimoto | 198/819 |
| 5,836,440 | A | * | 11/1998 | Mindich | 198/819 |
| 6,170,644 | B1 | * | 1/2001 | Nakaegawa et al. | 198/811 |

FOREIGN PATENT DOCUMENTS

| EP | 0 058 040 | 8/1982 |
| GB | 571 210 | 8/1945 |
| WO | 01/85579 | 11/2001 |

* cited by examiner

*Primary Examiner*—Gene Crawford
*Assistant Examiner*—Yolanda Cumbess
(74) *Attorney, Agent, or Firm*—Young & Thompson

(57) ABSTRACT

A floating conveyor belt (20) for a belt conveyor forms a loop and includes a surface (32) for receiving transportable products arranged on one face thereof and a surface (30) supported by a support structure and arranged on the other surface thereof. The belt (20) is embodied in the form of an unflattened tube over the main part thereof and contains the product receiving surface (32) arranged thereinside, thereby delimiting a closed tubular space for confining transported products.

8 Claims, 9 Drawing Sheets

CONVEYOR BELT AND CONVEYOR COMPRISING SAID BELT

The present invention relates to a belt for a belt conveyor and a conveyor comprising said belt.

The use of belt conveyors for moving extracted rock in quarries or mineral extraction sites is known. This movement may take place over relatively long distances which may be as much as several tens of kilometers.

The conveyors that are used make use of belts which are commonly carried by guide rollers distributed along the path of the belt.

When the transported material is powdered, it is preferable for the conveyors to be closed with covers preventing the dispersion of the powdered material.

The rollers used for supporting the conveyor belt are difficult to position and adjust.

To overcome this problem, the design of floating conveyor belts has been proposed, these belts being capable of moving on the surface of water, either on the surface of an existing watercourse or on the surface of a channel specifically created to support the belt.

The conveyor belt generally has a trough-shaped cross section, and when the material is powdered it tends to escape, making it necessary to provide a cover. Such a cover is also desirable in order to limit the accumulation of water on the belt in case of rain, which could cause the floating belt to sink. However, it is difficult to position a cover over a liquid surface.

The object of the invention is to propose an economically viable solution for conveying materials, particularly powdered materials, over long distances.

For this purpose, the invention proposes a belt of the aforesaid type, characterized in that it has the shape of an unflattened tube over the main part of its length, the belt delimiting a closed tubular space for confining transported products with the product receiving surface on the inside of the tube.

In specific embodiments, the belt has one or more of the following characteristics:
- at rest, the belt delimits an unflattened closed space and each section of the belt forms a closed profile;
- the tube delimited by the belt is split longitudinally along the whole length of the belt, the belt having two longitudinal lips adjacent to each other over most of the length of the belt;
- it has a ballast along its length, generally extending along a generatrix of the tube formed by the belt; and
- the inner perimeter of the tube delimited by the strip is in the range from 0.5 m to 3 m.

The invention also proposes a belt conveyor having:
- a conveyor belt as described above,
- belt support means; and
- means of driving the belt for movement along its path.

Advantageously, the conveyor has one or more of the following characteristics:
- the drive means have drive rollers associated with a gear motor for driving the rollers, these drive rollers being positioned on either side of the belt and this belt being gripped between the rollers;
- the support means include, over at least part of the path of the belt, a body of water on which the belt floats;
- the support means include a pipe partially filled with water to form said body of water, the belt travelling through the pipe on at least part of its path;
- it has at least one loading station provided with divergent cam surfaces engaged between the lips of the belt and capable of separating them when the belt advances; and
- the conveyor has at least one bend along its path, and means of driving the belt are positioned immediately upstream of the bend, with respect to the direction of advance of the belt.

The invention will be more clearly understood with the aid of the following description, provided solely by way of example, with reference to the drawings, in which.

Figure 1A:
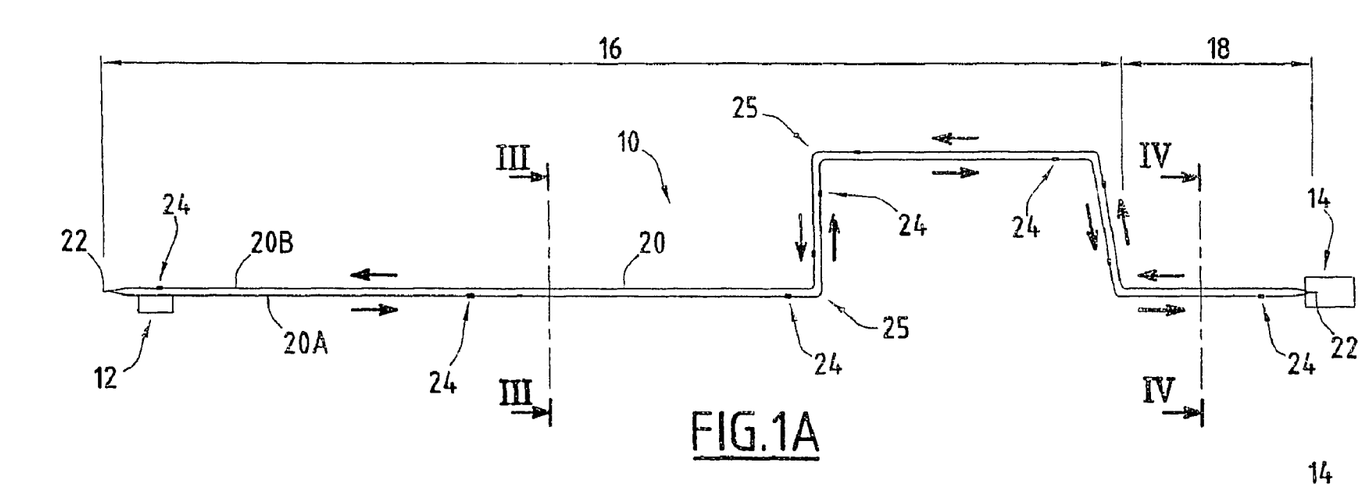
FIGS. 1A and 1B are, respectively, views from the top and the side of a conveyor according to the invention.
Figure 1B:
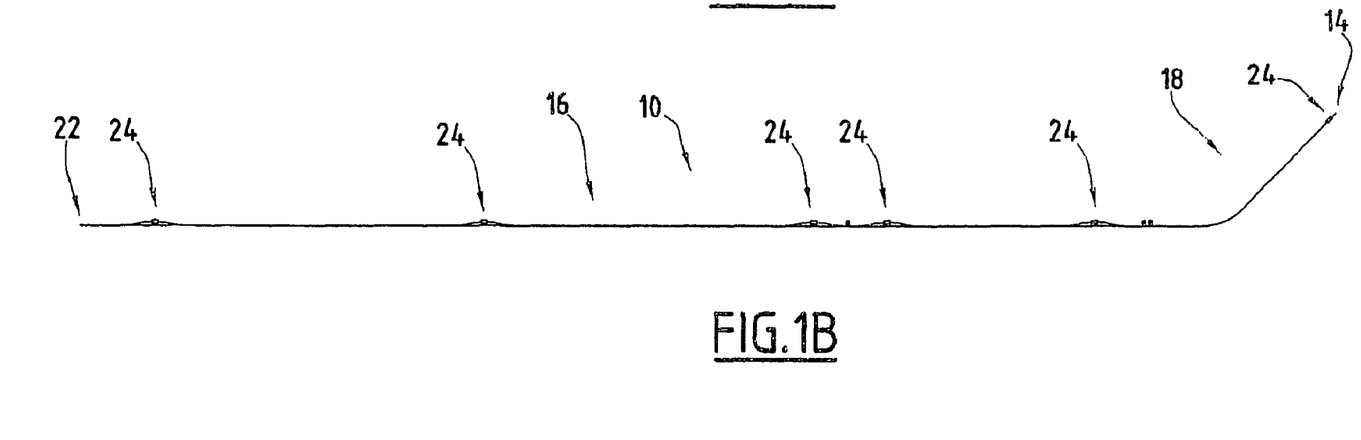

FIGS. 1A and 1B show a conveyor 10 according to the invention. This conveyor is intended to transport materials, particularly powdered bulk materials such as gypsum, over a large distance which may be as much as several tens of kilometers. This transportation takes place between at least one loading station 12 and a discharge station 14. The direction of movement is represented by arrows in FIG. 1A.

In the example under consideration, the conveyor extends in an essentially flat area 16 and then on a slope 18 having a marked difference in level, the discharge station being at the top of the slope 18.

The conveyor 10 has a floating endless belt 20 closed in the form of a loop and having a transport portion 20A and a return portion 20B generally extending parallel to each other along the movement path of the conveyor. This belt is held from its ends between two return rollers 22 of which one is provided in the discharge station 14 while the other is provided downstream of the loading station 12.

Along its path, the belt rests on and moves with respect to suitable support means which are described below.

Driving stations indicated by the general reference 24 are distributed along the length of the belt. In the embodiment shown in FIGS. 1A and 1B, the path of the belt has bends 25. The driving stations are positioned on each of the portions of the belt, generally immediately upstream of these bends 25 with respect to the direction of advance of the portion concerned. Thus the belt is generally pulled rather than pushed.

Figure 2A:
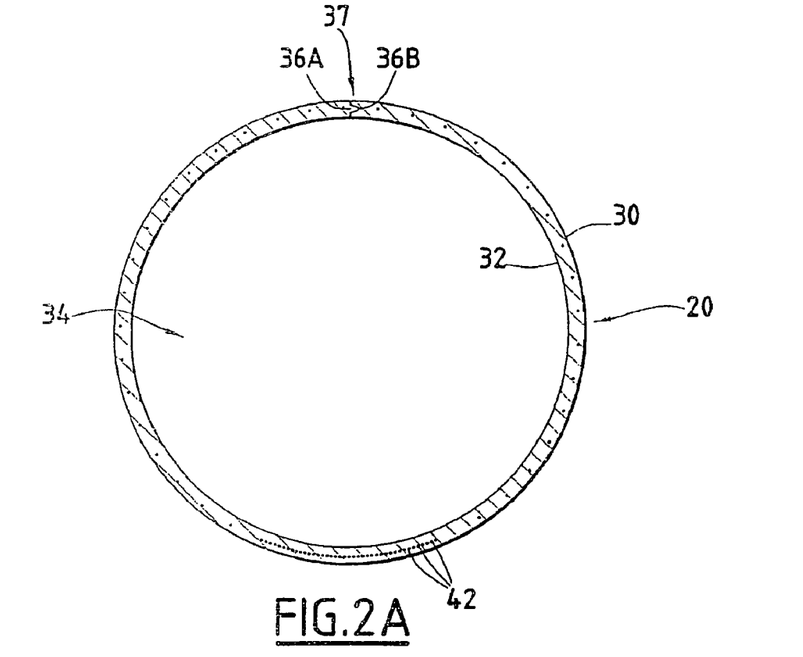
FIGS. 2A and 2B are, respectively, cross-sectional and perspective views of a section of the belt according to the invention.
Figure 2B:
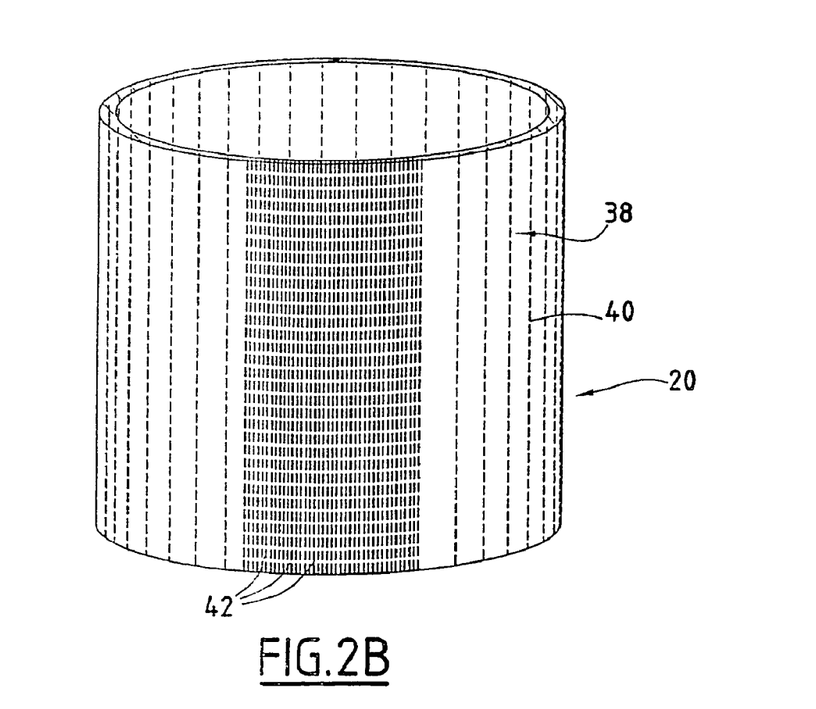

According to the invention, and as shown in FIGS. 2A and 2B, the belt 20 generally takes the form of an unflattened tube and forms a closed profile along virtually all of its length in section.

More precisely, the belt 20 has an outer surface 30 and an inner surface 32 which forms a support surface for the products to be transported.

The belt forms a tubular closed space 34 inside itself. This closed space is generally of circular cross section, the belt fitting over a cylinder of circular section. The perimeter of the belt is advantageously in the range from 0.5 m to 3 m. For example, it is such that the diameter of the closed space 34 formed by the belt is substantially equal to 0.40 m and preferably in the range from 0.2 m to 1 m.

The belt is split longitudinally, the two lips marked 36A and 36B of the belt being adjacent to each other and forming between them a longitudinal slit 37 which is normally closed. In particular, the lip 36A has a projecting part forming a tenon, while the lip 36B has a complementary hollow part in its thickness, forming a mortise which can receive the projecting part of the lip 36A. This mortise and tenon joint is designed to provide a satisfactory tightness of the belt.

At rest, in other words in the absence of any external pull or load due to the materials contained in the space 34, the belt 20 is self-supporting, so that it remains in the shape of an unflattened tube which is preferably substantially circular.

The belt 20 is generally made from rubber or PVC, and is reinforced longitudinally along the whole of its length by a metal or synthetic reinforcement 38 made from longitudinal reinforcing wires 40 which are embedded in the rubber.

A ballast 42 is provided in the belt along the generatrices of the belt in an area generally opposite the longitudinal slit 37. This ballast is formed by a greater density of reinforcing wires.

Figure 3:
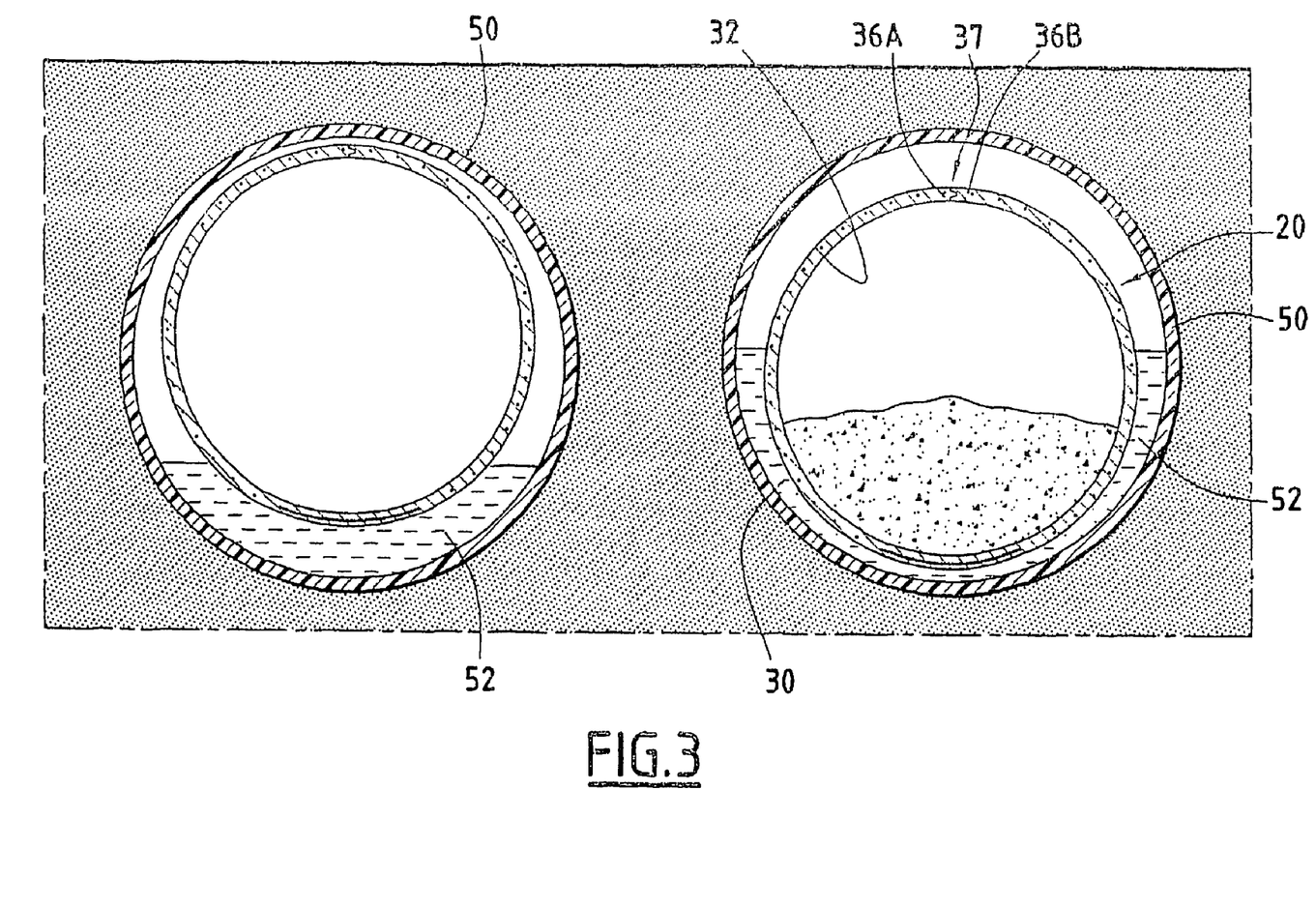
FIG. 3 is a cross-sectional view of the conveyor taken along the line III-III.

As shown in FIG. 3, in the flat region 16, away from the immediate vicinity of the return rollers 22 and the driving stations 24, both the transport portion 20A and the return portion 20B of the belt 20 are contained in a pipe 50 which is partially filled with water 52 to support the belt.

More precisely, and as shown in FIG. 3, two adjacent pipes 50 are formed in the ground. These pipes, having a circular cross section for example, have a diameter greater than the outside diameter of the tube formed by the belt.

The quantity of water 52 contained in the pipe is such that the belt, whether loaded or unloaded, can float on the surface of the body of water, without striking the upper or lower part of the pipe.

Figure 4:
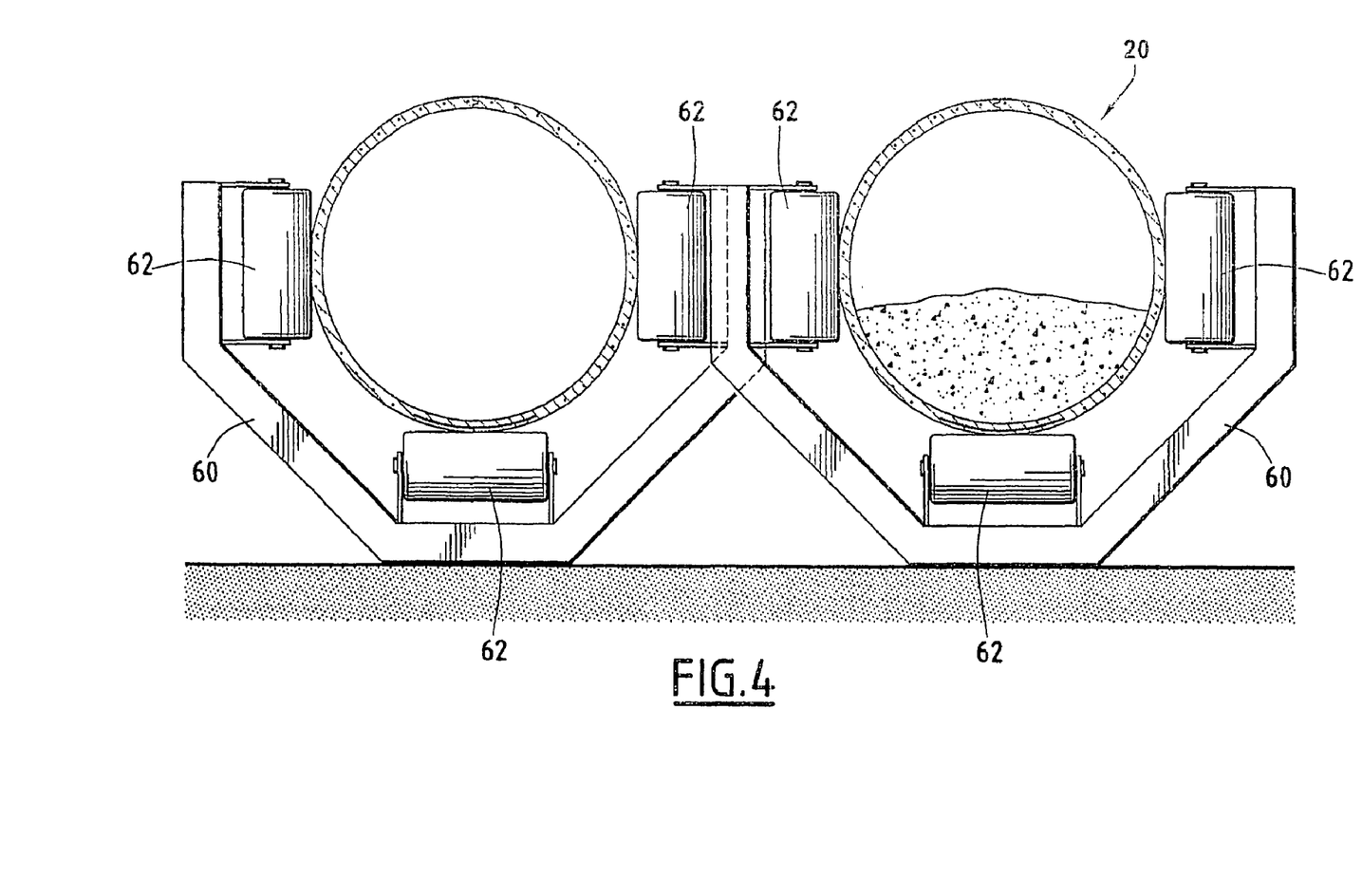
FIG. 4 is a sectional view of the conveyor taken along the line IV-IV.

On the other hand, in the sloping regions, and particularly in the region 18, the conveyor, as shown in FIG. 4, has belt support frames 60 fitted with guide rollers 62. The guide rollers 62 include, for example, a lower roller with a horizontal axis and two lateral rollers with vertical axes between which one portion of the belt is gripped.

Figure 5:
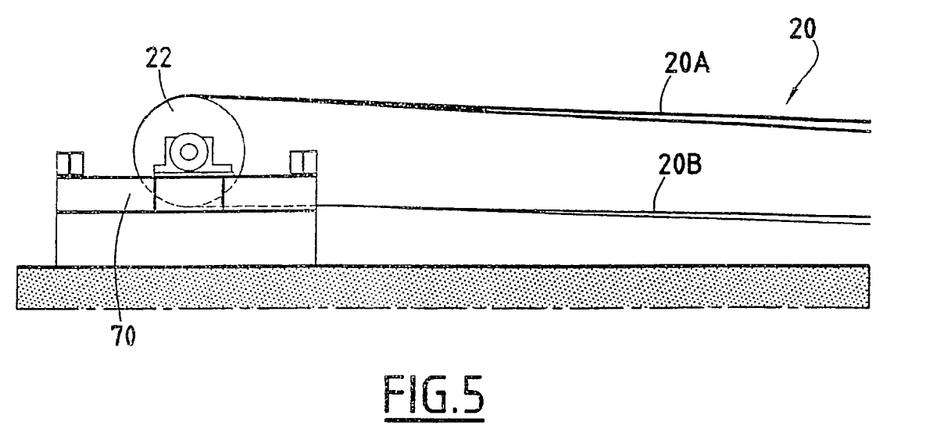
FIG. 5 is a view of the downstream end of the conveyor corresponding to the discharge site.

At its ends, as shown in FIG. 5, the belt rests on a return roller 22 supported by a support frame 70, the roller being mounted rotatably with respect to this frame. This roller is unpowered. In a variant, this roller is powered.

The belt 24 becomes progressively flattened to form a flattened tube as it passes around the roller 22. At the downstream end of the portion 20A, the roller 22 also ejects the products from the belt, as described below.

Figure 6:
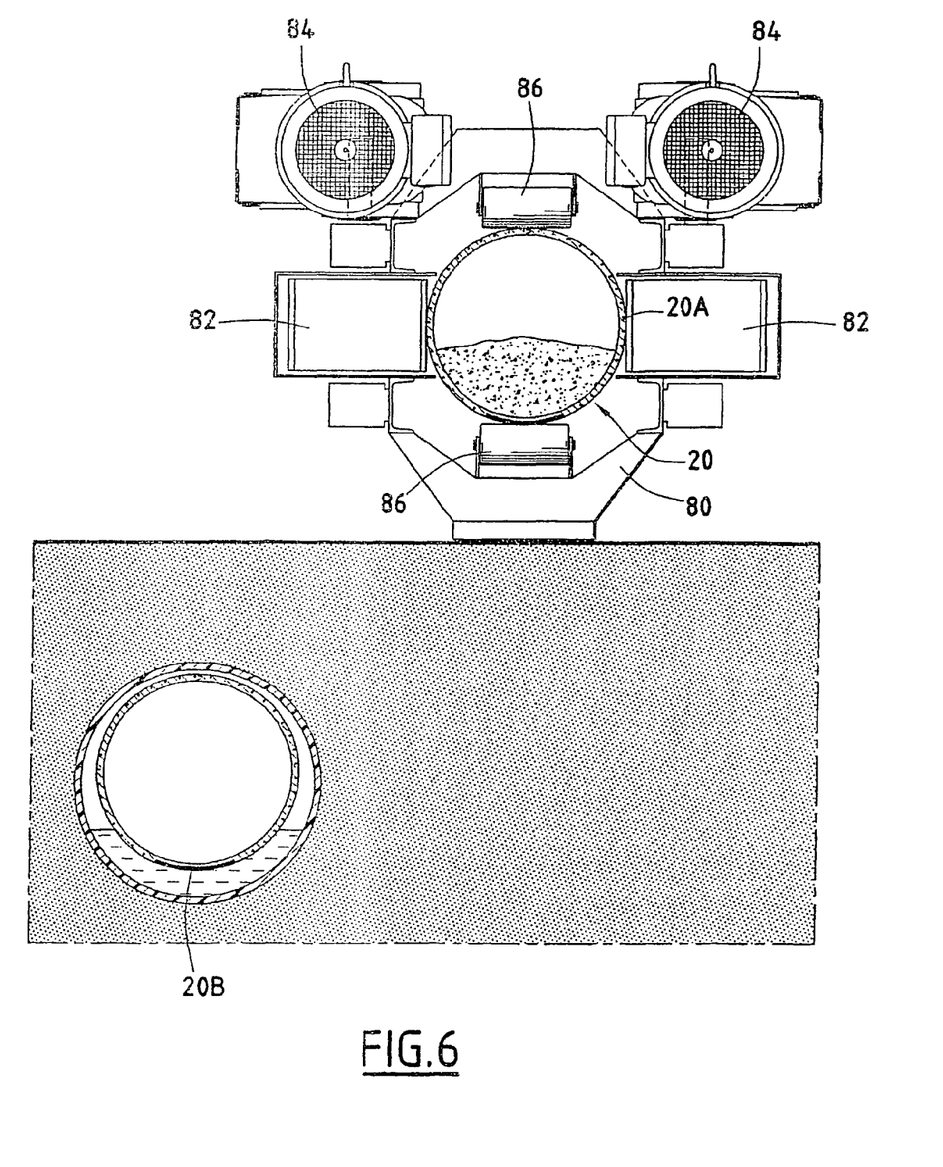
FIG. 6 is a sectional view of the conveyor taken in a driving station.
Figure 7:
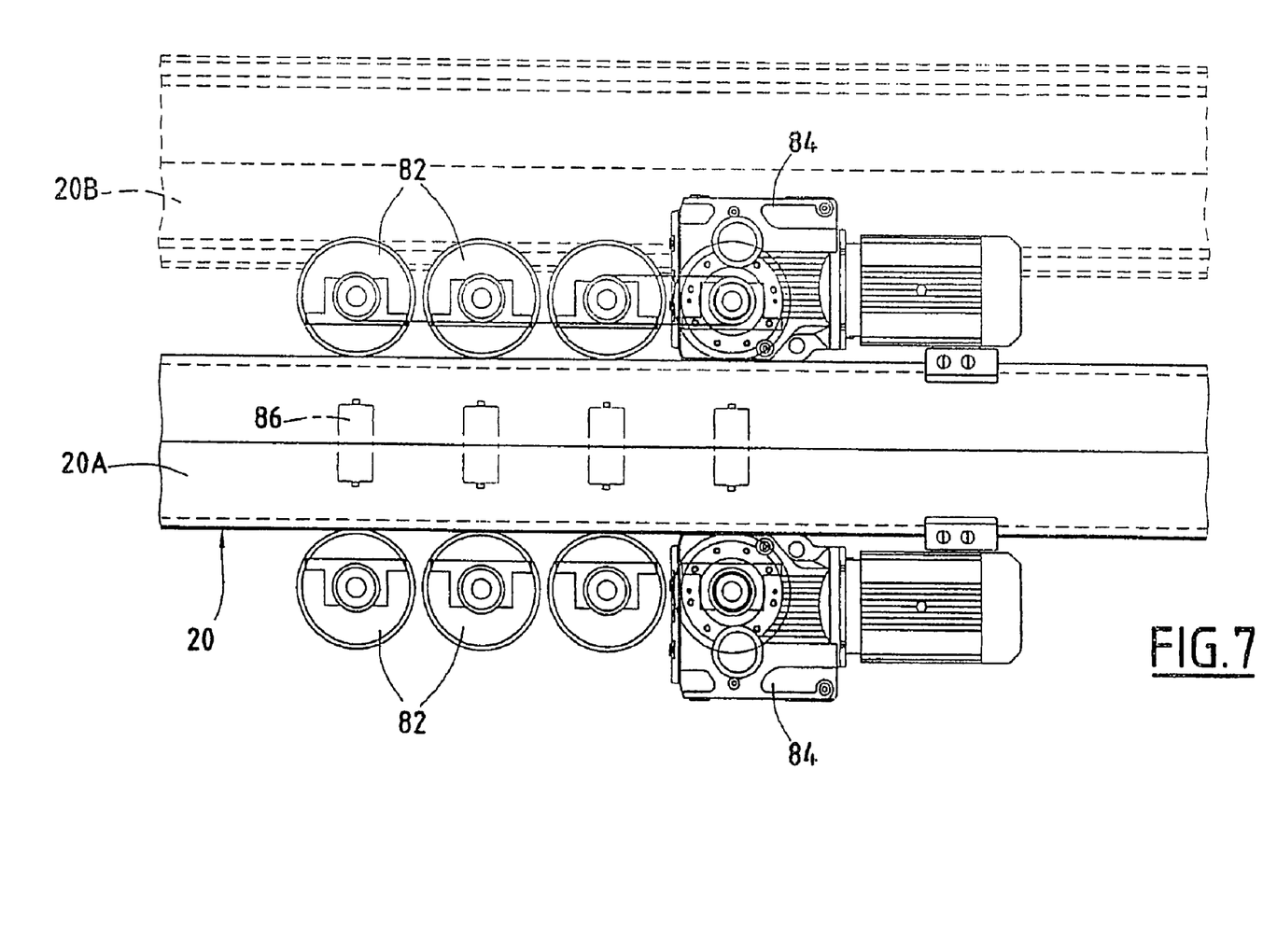
FIG. 7 is a view of the conveyor from above in a driving station.

A driving station 24 is shown in FIGS. 6 and 7. In one of these stations, the portion, for example 20A, of the belt which is to be driven is carried out of the pipe 50 and projects from the surface of the ground. On the ground, the driving station has a belt support cradle 80 fitted with lateral driving rollers 82 between which the driven portion of the belt is gripped. More precisely, four successive driving rollers 82 are positioned laterally on each side of the belt. The belt is gripped between two corresponding pairs of rollers. The rollers positioned on the same side are associated with the same driving gear motor unit 84. The belt is also retained, in its lower part and in its upper part, between two idle rollers 86.

Thus the belt is totally confined between the driving rollers 82 and the retaining rollers 86.

These driving stations are located, for example, one every kilometer.

Figure 8A:
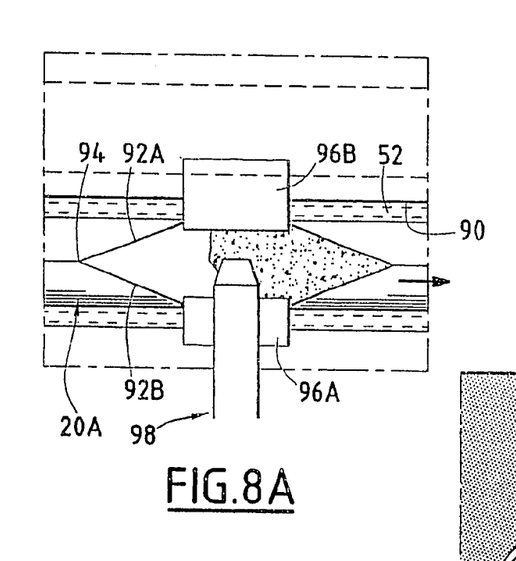
FIGS. 8A and 8B are, respectively, a view from above and a sectional view of the conveyor in a loading station.
Figure 8B:
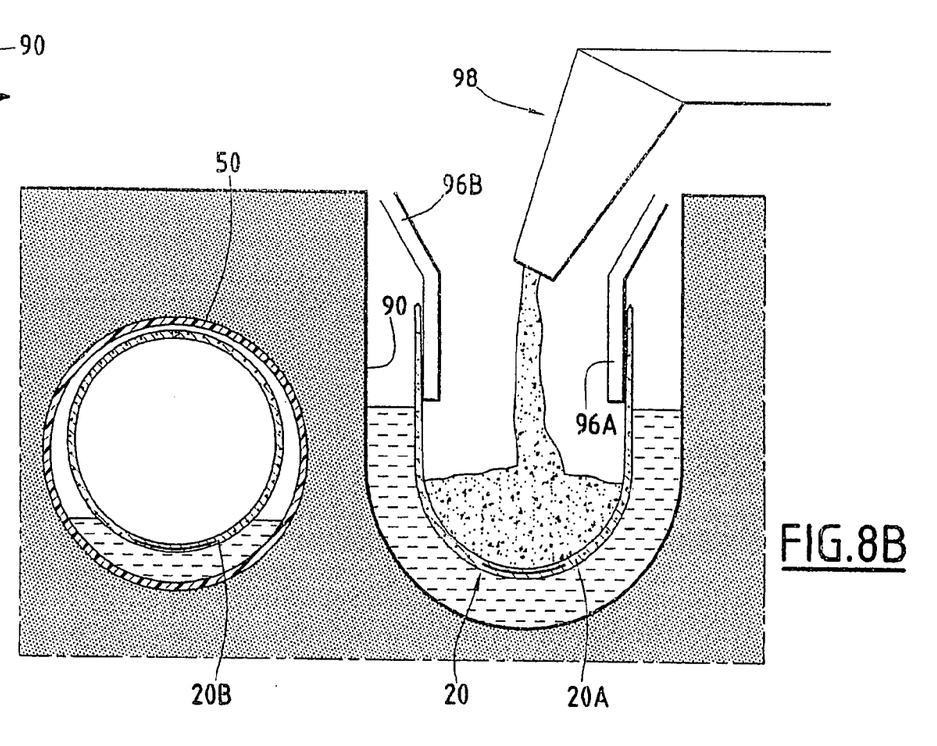

FIGS. 8A and 8B show a schematic view of the loading station 12 positioned upstream on the transport portion 20A.

In this station, the pipe containing the portion 20A is open to the air over its whole width and thus forms a channel 90 containing water 52. This channel is continued on both sides by the pipe 50, and the belt 20 travels along the length of this channel.

Two divergent cam surfaces 92A and 92B are fixed in this channel and are engaged through the longitudinal slit 37 formed in the belt. These two cam surfaces 92A and 92B meet each other at a common front end 94 forming a point, and diverge from each other along the direction of advance of the portion of the belt. These cam surfaces are extended by generally parallel retaining plates 96A and 96B, on the outer surfaces of which the two separated lips 36A and 36B of the belt bear, as shown in FIG. 8B. These outer surfaces are separated by a distance equal to the diameter of the tube formed by the belt 20.

A chute 98 for guiding the materials to the belt opens between the two plates 96A and 96B.

These plates extend over a length of several metres. Downstream of these plates, the belt is left free, in such a way that the two lips 36A and 36B of the belt meet each other because of the inherent resilience of the belt.

This installation operates in the following way.

The belt is continuously driven by the action of the driving stations 24. In these stations, the belt 20 is gripped between the driving rollers 82 which impart a longitudinal advance movement to it.

Outside the driving stations 24, the belt rests on the surface of the water in the pipes 50 or on the rollers 62 in the sloping sections of the conveyor.

In the pipes 50, the belt is held with its longitudinal slit in the upper part, because of the ballast 42 incorporated in the belt and diametrically opposite the longitudinal slit for access to the inside of the belt.

Clearly, since the belt forms a closed tubular space, any dust which may be created by the transport of a powdered material is kept confined inside the space 24 and therefore does not damage the environment.

For loading, as shown in FIGS. 8A and 8B, the belt is progressively opened by the diverging surfaces 92A and 92B as it advances. When the two lips of the belt are kept separated by the plates 96A and 96B, the material to be transported is deposited on the inner surface 32 of the belt. The belt is then closed by the effect of its own resilience. The belt can thus be continuously loaded.

Similarly, the belt is progressively discharged immediately downstream of the return roller 22 provided at the downstream end of the transport portion 20A. At this end, the belt is flattened and the two lips 36A and 36B which are normally joined are separated, allowing the discharge of the material contained in the tubular space 24 formed by the belt.

Clearly, this conveyor can transport materials efficiently, while avoiding complex arrangements for avoiding the leakage of powdered materials.

Because of the long distances that can be covered by this conveyor, it can be used to relieve the pressure on road transport.

Figure 9:
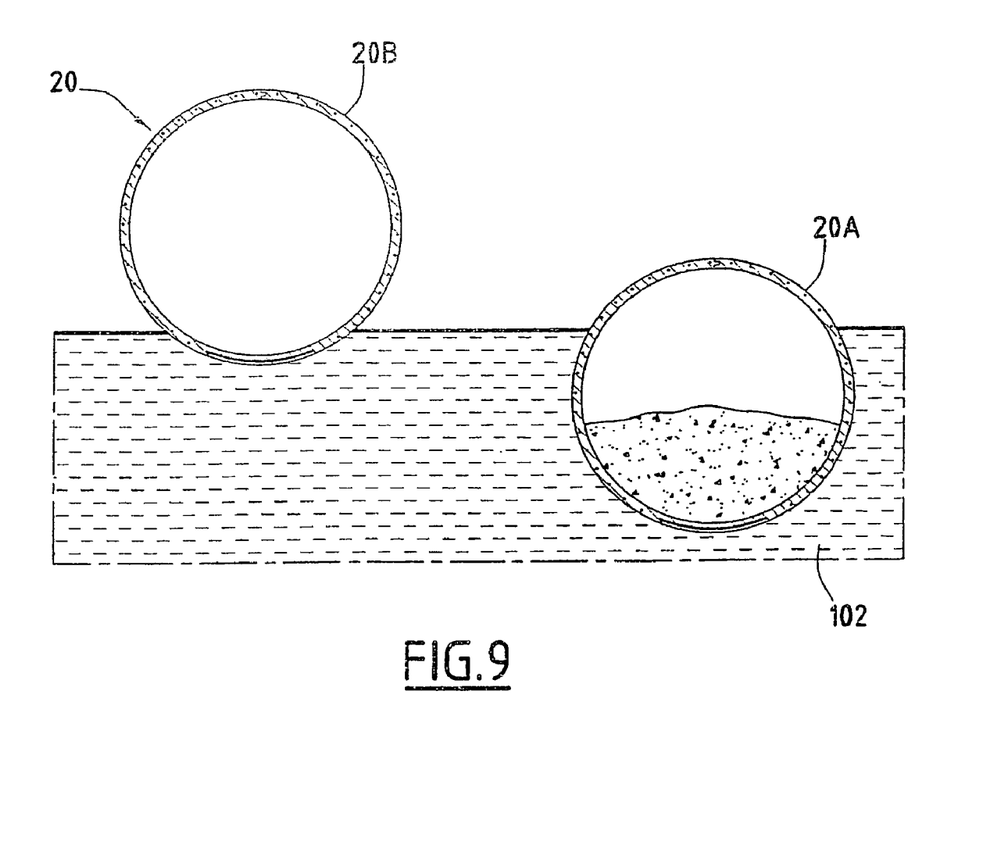
FIG. 9 is a sectional view of a variant embodiment of said conveyor in which the belt is supported on the surface of a body of open water such as a pond.

FIG. 9 shows schematically another embodiment of this conveyor. In this case, in the flat areas, the belt floats on the surface of a body of water which is not confined in an underground pipe 50, but which consists of the water 100 of a river or a pond.

In this case, the transport portion and the return portion 20A and 20B of the belt float on the surface of the same body of water.

It is assumed that the conveyor described here transports materials obtained from a quarry. A variant of this conveyor can be used to transport waste materials, particularly domestic waste. In this case, the tubular belt travels in a pipe of the sewerage system. Loading stations are provided at regular intervals along the whole path of the belt, to enable users to dispose of their waste by tipping it on to the belt.

In this case, for example, one of the return rollers is eliminated and the belt travels through the sewerage system to form a loop, the belt being guided along its path by the sewerage pipe. In this case, only one return roller is present, and is used for discharging the contents of the belt.

The invention claimed is:

1. Conveyor, comprising:
a conveyor belt (20), wherein,
i) the belt forms a loop and comprises a surface (32) on one face for receiving products to be transported, and another surface (30) on another face for bearing on a support structure (52, 60),
ii) the belt (20) comprises a shape, along most of its length, of a substantially circular unflattened tube, the belt being self-supporting so that the belt remains in the shape of the unflattened tube and forming a closed tubular space for confining the products to be transported, with the product receiving surface (32) inside the tube, at rest, the belt (20) forming an unflattened closed space, and each section of the belt forms a closed profile, and
iii) the belt comprises two lips adjacent to each other, and the belt is closed by effect of its own resilience so that a normally-closed longitudinal slit is formed between the two lips;
belt support means (52, 60);
means (24) of driving the belt for movement along its path; and
at least one loading station (12) provided with diverging cam surfaces (92A, 92B) engaged between the lips (36A, 36B) of the belt and capable of causing the separation of the lips when the belt advances.

2. Conveyor according to claim 1, further comprising at least one bend (25) along its path, and wherein the means (24) for driving the belt are positioned immediately upstream of the bend (25), with respect to the direction of advance of the belt.

3. Conveyor according to claim 1, wherein the belt further comprises a transport portion (20A) and a return portion (20B), both the transport portion (20A) and the return portion (20B) floating on the surface of a body of water (52; 102) forming the support means.

4. Conveyor according to claim 1, wherein the belt further comprises, along its length, a ballast (42) extending generally along a generatrix of the tube formed by the belt.

5. Conveyor according to claim 1, wherein an inner perimeter of the tube formed by the belt is in the range from 0.5 m to 3 m.

6. Conveyor according to claim 1, wherein the support means include, over at least part of the path of the belt (20), a body of water (52; 102) on which the belt (20) floats.

7. Conveyor according to claim 6, wherein the support means include a pipe (50) partially filled with water (52) to form said body of water, the belt (20) travelling through the pipe (50) on at least part of its path.

8. Conveyor according to claim 1, wherein the drive means comprises drive rollers (82) associated with a gear motor unit (84) for driving the rollers, the drive rollers (82) being positioned on either side of the belt (20) and the belt being gripped between the rollers (82).

* * * * *